(12) United States Patent
Choi (10) Patent No.: US 11,567,271 B2
(45) Date of Patent: Jan. 31, 2023

(54) OPTICAL CONNECTOR HAVING FLANKING AND ROTATABLE ELEMENTS

(71) Applicant: A.J. WORLD CO., LTD., Seoul (KR)

(72) Inventor: Sun Ho Choi, Seoul (KR)

(73) Assignee: A.J. World Co., Ltd., Seoul (KR)

( * ) Notice: Subject to any disclaimer, the term of this patent is extended or adjusted under 35 U.S.C. 154(b) by 0 days.

(21) Appl. No.: 17/387,241

(22) Filed: Jul. 28, 2021

(65) Prior Publication Data

US 2022/0283386 A1 Sep. 8, 2022

(30) Foreign Application Priority Data

Mar. 4, 2021 (KR) ........................ 10-2021-0028880

(51) Int. Cl.
*G02B 6/38* (2006.01)

(52) U.S. Cl.
CPC .................................. *G02B 6/3887* (2013.01)

(58) Field of Classification Search
CPC .................................................... G02B 6/3887
See application file for complete search history.

(56) References Cited

U.S. PATENT DOCUMENTS

| 6,926,449 B1 * | 8/2005 | Keenum | G02B 6/3897 |
| | | | 385/136 |
| 7,296,935 B1 * | 11/2007 | Childers | G02B 6/3885 |
| | | | 385/59 |
| 8,270,797 B2 * | 9/2012 | Zhou | G02B 6/4466 |
| | | | 385/135 |
| 8,297,850 B2 * | 10/2012 | Nishioka | G02B 6/3846 |
| | | | 385/100 |
| 9,063,301 B2 * | 6/2015 | Wei | G02B 6/3888 |
| 10,345,529 B2 * | 7/2019 | Cao | G02B 6/3803 |
| 2008/0107381 A1 * | 5/2008 | Nishioka | G02B 6/3829 |
| | | | 385/60 |
| 2009/0220197 A1 * | 9/2009 | Gniadek | G02B 6/3888 |
| | | | 385/62 |
| 2010/0310222 A1 * | 12/2010 | Zhou | G02B 6/4466 |
| | | | 385/135 |

(Continued)

FOREIGN PATENT DOCUMENTS

| KR | 10-1114289 B1 | 3/2012 |
| KR | 20-0485300 B1 | 12/2017 |
| KR | 10-2020-0044928 A | 4/2020 |

OTHER PUBLICATIONS

Office Action in Korean Application No. 10-2021-0028880 dated Oct. 27, 2022 and English translation.

*Primary Examiner* — Andrew Jordan
(74) *Attorney, Agent, or Firm* — Knobbe, Martens, Olson & Bear, LLP (57) ABSTRACT

This application relates to an optical connector. In one aspect, the optical connector includes a connector unit including a receiving space in which an optical cable is inserted, and an opening which opens downwardly at a rear end portion of the connector unit. The optical connector may also include a first body surrounding at least a portion of a top of the connector unit, and a second body disposed under the first body, a front end portion of which is rotatably connected to the connector unit to open and close the opening. The optical connector may further include a boot rotatably coupled to the first body and the second body to fix the optical cable inserted in the connector unit.

9 Claims, 5 Drawing Sheets

(56) References Cited

U.S. PATENT DOCUMENTS

| | | | |
|---|---|---|---|
| 2018/0299623 A1* | 10/2018 | Cao | G02B 6/3809 |
| 2022/0283385 A1* | 9/2022 | Choi | G02B 6/3869 |
| 2022/0283386 A1* | 9/2022 | Choi | G02B 6/3887 |

* cited by examiner

OPTICAL CONNECTOR HAVING FLANKING AND ROTATABLE ELEMENTS

CROSS-REFERENCE TO RELATED APPLICATION

This application claims priority to Korean Patent Application No. 10-2021-0028880, filed on Mar. 4, 2021. The entire contents of the application on which the priority is based are incorporated herein by reference.

BACKGROUND

Technical Field

The present disclosure relates to an optical connector.

Description of Related Technology

Recently, a fiber-to-the-home (FTTH) system is being deployed on houses, apartments, etc. to provide various information including broadcasts and communications via optical cables.

In the FTTH system, optical cables are connected all the way to subscriber equipment, and terminated with connectors and installed on a wall. In this case, the FTTH worker conventionally add a few extra meters to the actual length of the optical cables when running them into the home, in consideration of the connections between the optical cables. Then, the worker would cut the optical cables to a required length at the installation site, assemble optical connectors onto their ends, and connect them to a fiber optic termination box and optical adapters in the home.

SUMMARY

One aspect is an optical connector which allows for efficiently managing and fixing a plurality of optical connectors.

Another aspect is an optical connector including: a connector unit including a receiving space in which an optical cable is inserted, and an opening which opens downwardly at a rear end portion of the connector unit; a first body surrounding at least a portion of a top of the connector unit; a second body disposed under the first body, a front end portion of which is rotatably connected to the connector unit to open and close the opening; and a boot rotatably coupled to the first body and the second body to fix the optical cable inserted in the connector unit.

The connector unit may include: a connector body portion that provides the receiving space; a connector clamp portion that extends from a rear end of the connector body portion, and includes the opening; a latch portion obliquely extending at an angle from a front end portion of the connector body portion; and hinge protuberant portions protruding from two opposite sides of the connector body portion.

The first body may include: a first body portion provided with a mounting groove in which an upper portion of the connector unit is seated; a first connector clamp portion extending from a rear end of the first body portion so that the optical cable is inserted therein; and a guide flap portion obliquely extending in an upper direction from the top of the first body portion.

The second body may include: a second body portion to be assembled to a bottom of the first body portion; a second connector clamp portion extending from a rear end of the second body portion to correspond to the first connector clamp portion; and a hinge connecting portion provided at a front end of the second body portion.

The first body may further include: a pressing protuberant portion protruding from the first connector clamp portion to apply pressure to an upper outer surface of the optical cable.

The first body may further include: a first clamp threaded portion protruding in a helical shape on an outer surface of the first connector clamp portion so that the boot is rotatably coupled thereto.

The second body may further include: a pressing bump portion protruding from the second connector clamp portion to apply pressure to a lower outer surface of the optical cable.

The connector unit may include: a first connector body portion; a second connector body portion; and hinge protuberant portions protruding from two opposite sides of each of the first connector body portion and the second connector body portion, and wherein the hinge connecting portion may include: a pair of hinge hole parts provided on two opposite sides of the front end of the second body portion so that the hinge protuberant portions on outer sides of the first connector body portion and the second connector body portion are rotatably connected thereto; and a hinge groove part provided between the pair of hinge hole parts so that the hinge protuberant portions on inner sides of the first connector body portion and the second connector body portion are rotatably connected thereto.

The second body may further include: a second clamp threaded portion protruding in a helical shape on an outer surface of the second connector clamp portion to extend continuously in a rotation direction of the first clamp threaded portion.

According to embodiments of the present disclosure, it is possible to reduce the time taken to install a plurality of connector units at a site and to efficiently connect a plurality of connector units to a fiber optic termination box or optical adapters.

DETAILED DESCRIPTION

LC, ST, FC and SC connectors are widely used as optical connectors for connecting optical cables. However, most optical connectors take considerable time for site installation, and connecting optical fibers at the site is not an easy process. Moreover, it is hard to connect and install multiple optical connectors to a fiber optic termination box or optical adapters in an efficient way.

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, 'accessed' to, 'supplied' to, 'transferred' to, or 'contacted' with another element, it should be understood that the element may be directly connected to, supported by, accessed to, supplied to, transferred to, or contacted with another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as the upper side and the lower side, are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Hereinafter, a concrete construction of an optical connector according to an embodiment of the present disclosure will be described with reference to FIGS. 1 to 5.

Figure 1:
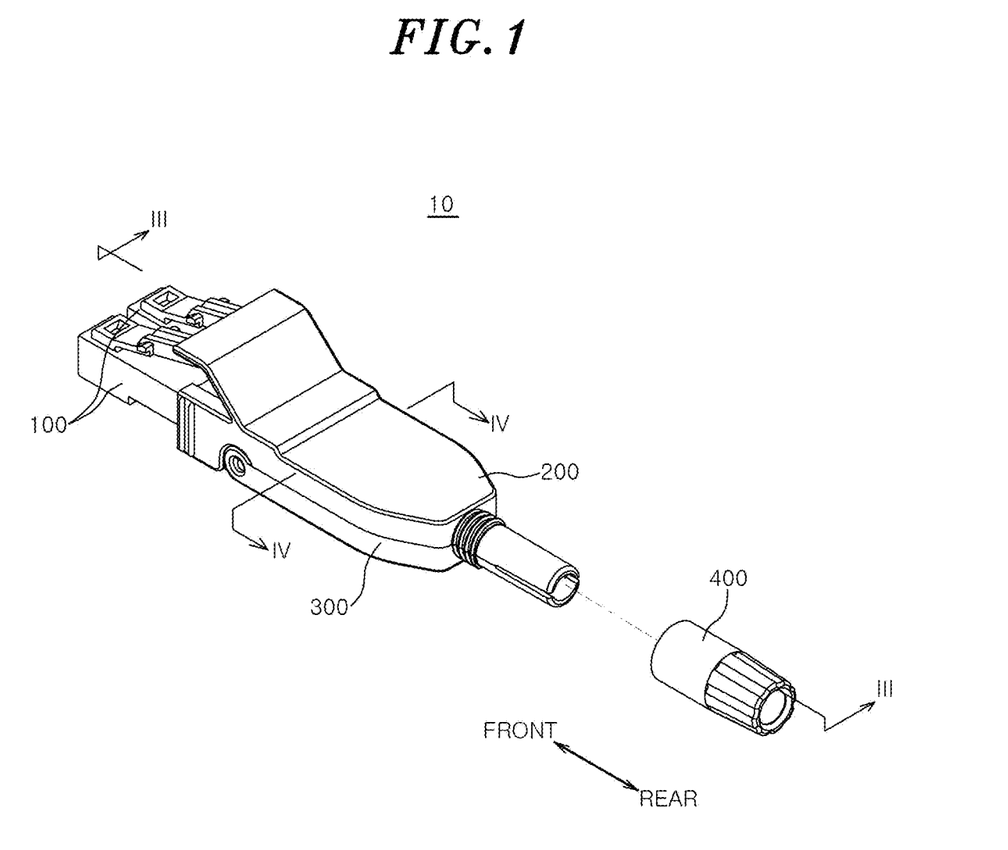
FIG. 1 is perspective view of an optical connector according to an embodiment of the present disclosure.
Figure 2:
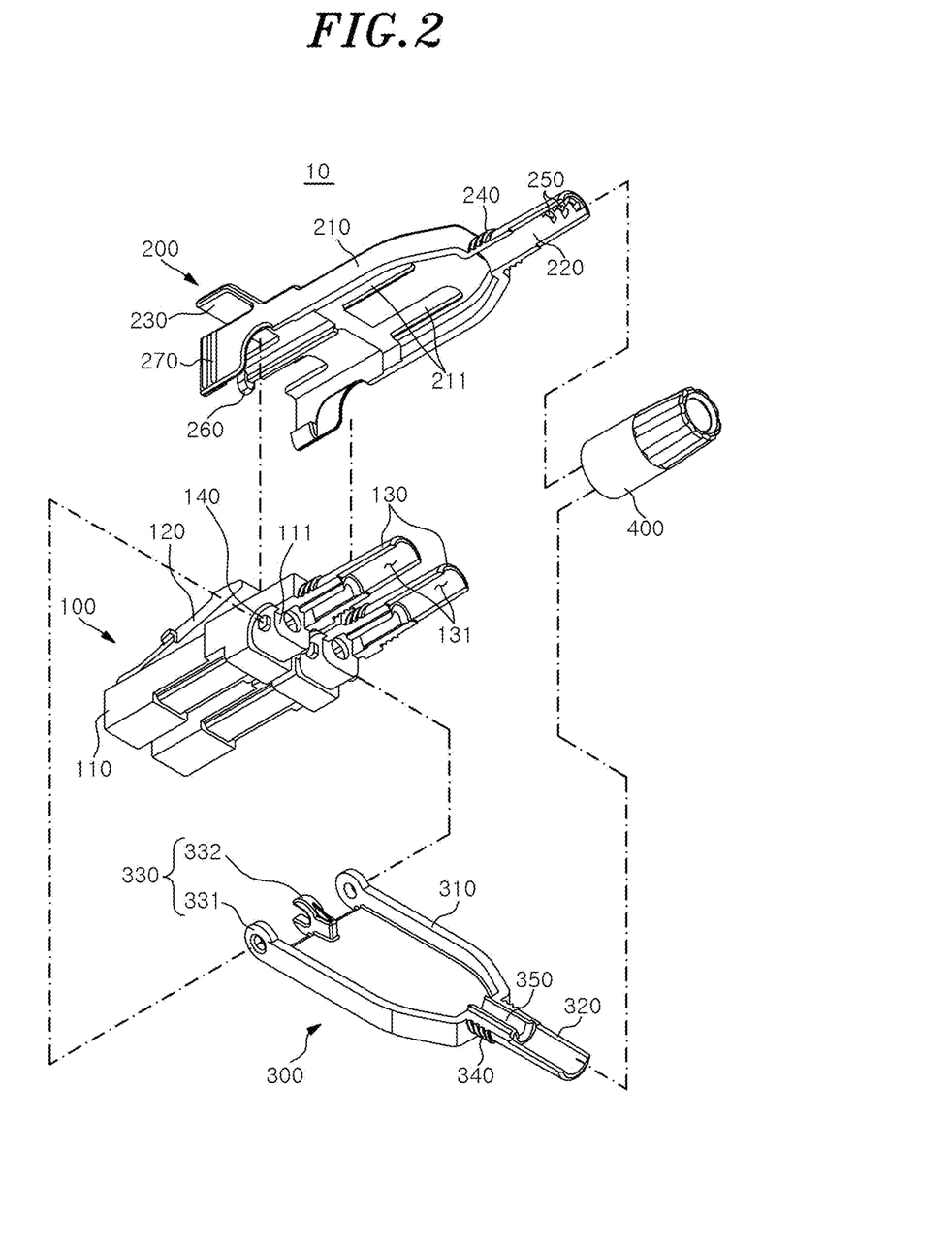
FIG. 2 is an exploded perspective view of the optical connector according to the embodiment of the present disclosure.
Figure 3:
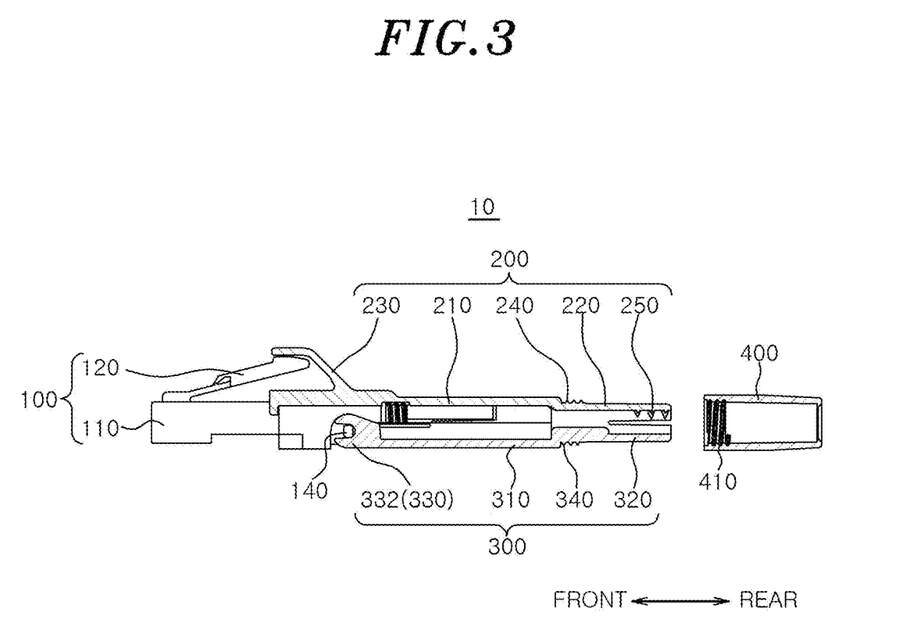
FIG. 3 is a cross-sectional view taken along the line "III-III" of FIG. 1.
Figure 4:
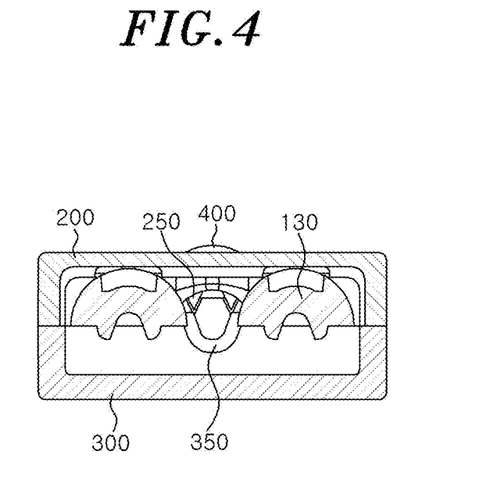
FIG. 4 is a cross-sectional view taken along the line "IV-IV" of FIG. 1.
Figure 5:
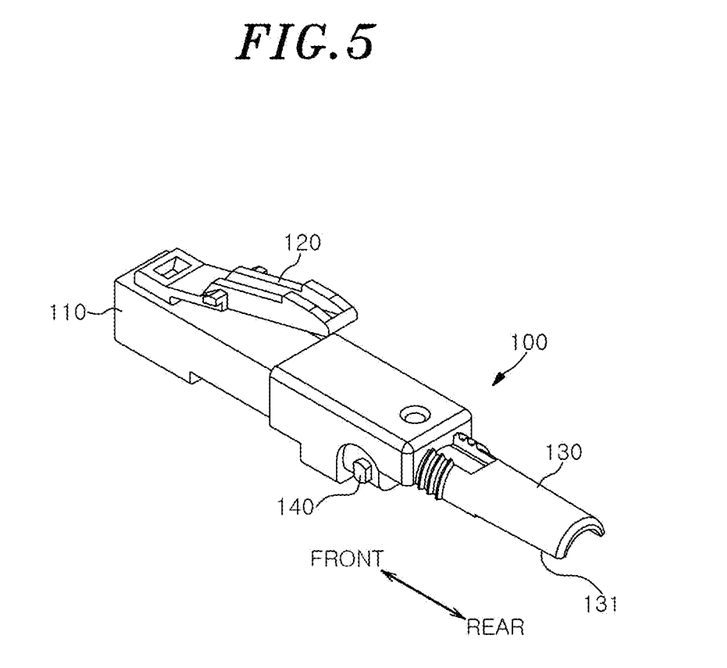
FIG. 5 is a perspective view of a connector unit of the optical connector according to the embodiment of the present disclosure.

FIG. 1 is perspective view of an optical connector according to an embodiment of the present disclosure. FIG. 2 is an exploded perspective view of the optical connector according to the embodiment of the present disclosure. FIG. 3 is a cross-sectional view taken along the line III-III of FIG. 1. FIG. 4 is a cross-sectional view taken along the line IV-IV of FIG. 1. FIG. 5 is a perspective view of a connector unit of the optical connector according to the embodiment of the present disclosure.

Referring to FIGS. 1 to 5, an optical connector 10 according to an embodiment of the present disclosure may include one or more connector units 100, a first body 200, a second body 300, and a boot 400. In this embodiment, two connector units 100 may be inserted into the optical connector 10 and mounted therein.

Specifically, each of the connector units 100 may include a receiving space 111 where an optical cable is inserted. The end of the optical cable may be inserted into the receiving space 111. Further, each of the receiving spaces 111 may include an optical connecting member. The optical connecting member is a typical component for connecting an optical fiber in a ferrule and an optical fiber in the optical cable, so a detailed description of the optical connecting member will be omitted.

Such a connector unit 100 may include a connector body portion 110, a latch portion 120, a connector clamp portion 130, and a hinge protuberant portion 140. The connector body portion 110 may include the receiving space 111. The latch portion 120 may obliquely extend in a rear direction from a front end portion of the connector body portion 110. The connector clamp portion 130 may extend from a rear end portion of the connector body portion 110. The hinge protuberant portion 140 may protrude from two opposite sides of the connector body portion 110.

The latch portion 120 may function as a clamp for assembling with a connector connection device (e.g., an adapter). The latch portion 120 may be formed in a shape of a hook for coupling with the connection device. An upper end of the latch portion 120 may be covered by a guide flap portion 230 of the first body 200.

A cross section of the connector clamp portion 130 may have a semi-circular shape. The connector clamp portion 130 may extend from the rear end portion of the connector body portion 110 and may provide an opening 131 which downwardly opens. The opening 131 may be opened and closed by the second body 300. When the opening 131 is opened by the second body 300, the end of the optical cable may be inserted into the receiving space 111 of the connector body portion 110. When the optical cable is closed by the second body 300, the semi-circular upper part of the optical cable may be covered by the connector clamp portion 130, and the semi-circular lower part of the optical cable may be covered by a second body portion 310 of the second body 300. In this case, the optical cable may be pressed against a pressing protuberant portion 250 of the first body 200 and fixed by the boot 400.

A pair of hinge protuberant portions 140 may be formed to protrude from two opposite sides of the connector body portion 110. The pair of hinge protuberant portions 140 may be rotatably coupled to a hinge connecting portion 330 of the second body 300. For example, when two connector units 100 are mounted to the second body 300, the hinge protuberant portions 140 on the outer sides of the two connector units 100 may be coupled to hinge hole parts 331 of the hinge connecting portion 330, and the hinge protuberant portions 140 on the opposite inner sides of the two connector units 100 may be coupled to a hinge groove part 332 of the hinge connecting portion 330.

The first body 200 may have a bracket shape that surrounds at least part of the top of the connector unit 100. The second body 300 may be assembled to the bottom of the first body 200 so that the first body 200 and the second body 300 may match each other. The first body 200 may be opened and closed by the second body 300.

The first body 200 may include a first body portion 210, a first connector clamp portion 220, the guide flap portion 230, a first clamp thread portion 240, and a pressing protuberant portion 250. The first body portion 210 may include a mounting groove 211 in which an upper portion of the connector unit 100 is seated. For example, when two connector units 100 are mounted to the first body 200, two mounting grooves 211 may be formed side by side on the first body portion 210.

An anti-rocking member 260 may be provided at a front end portion of the first body portion 210. The anti-rocking member 260 may be a protuberant structure that protrudes downward from the front end portion of the first body portion 210. When a pair of connector units 100 are mounted between the first body 200 and the second body 300, the anti-rocking member 260, positioned between the pair of connector units 100, keeps the connector units 100 from moving sideways, thereby preventing the connector units 100 from rocking within the optical connector 10.

Side ribs 270 may be formed on opposite sides of the front end portion of the first body portion 210. A pair of side ribs 270 may be formed to extend vertically from the opposite sides of the front end portion of the first body portion 210. The side ribs 270 may reinforce the structural strength of the first body portion 210.

A cross section of the first connector clamp portion 220 may have a semi-circular shape. The first connector clamp portion 220 may extend from the rear end of the first body portion 210. When the first connector clamp portion 220 is opened by the second body 300, the end of the optical cable may be inserted into the receiving space 111 of the connector unit 100. When the first connector clamp portion 220 of the first body 200 is closed by a second connector clamp portion 320 of the second body 300, the optical cable may be pressed against the pressing protuberant portion 250 of the first body 200 and fixed by the boot 400.

The guide flap portion 230 may obliquely extend in an upper direction from the top of the first body portion 210 toward the front of the first body portion 210. At least one connecting rib 280, e.g., three connecting ribs 280, may be formed at a spot where the guide flap portion 230 and the first body portion 210 are joined. Since the connecting rib 280 is formed at a structurally weak spot where the guide flap portion 230 and the first body portion 210 are joined, the joint spot between the guide flap portion 230 and the first body portion 210 may be structurally reinforced.

The first clamp threaded portion 240 may protrude in a helical shape on an outer surface of the first connector clamp portion 220 so that the boot 400 is rotatably coupled to it. For example, when the first body 200 is closed by the second body 300, the first clamp threaded portion 240 may take a form of a helix together with a second clamp threaded portion 340 of the second body 300.

A plurality of pressing protuberant portions 250 may protrude from the first connector clamp portion 220. When the first body 200 is closed by the second body 300, the pressing protuberant portions 250 may apply pressure to an upper outer surface of the optical cable, thereby steadily fixing the optical cable in place.

The second body 300 may be disposed under the first body 200. A front end portion of the second body 300 may be rotatably connected to the connector unit 100 to open and close the opening 131. The second body 300 may include the second body portion 310, the second connector clamp portion 320, the hinge connecting portion 330, the second clamp threaded portion 340, and a pressing bump portion 350.

The second body portion 310 of the second body 300 may have a bracket shape that can be assembled to a lower portion of the first body portion 210. The second body portion 310 may open and close the lower portion of the first body portion 210 by being rotatably connected to the connector unit 100.

The second connector clamp portion 320 may extend from the rear end of the second body portion 310 to correspond to the first connector clamp portion 220. A cross section of the second connector clamp portion 320 that extends from the rear end of the second body portion 310 may be a semicircular shape. When the second connector clamp portion 320 is rotated to open the first connector clamp portion 220, the end of the optical cable may be inserted into the receiving space 111 of the connector unit 100. When the second connector clamp portion 320 is rotated to close the first connector clamp portion 220, the optical cable may be fixed between the first body 200 and the second body 300.

The hinge connecting portion 330 may be rotatably coupled to the hinge protuberant portions 140 of the connector body portion 110. The hinge connecting portion 330 may include the hinge hole part 331 and the hinge groove part 332 which are provided at the front end of the second body portion 310.

The hinge hole part 331 may include a pair of hinge hole parts 331 provided in two opposite sides of the front end of the second body portion 310 to face each other. The hinge protuberant portions 140 of separate connector body portions 110 may be rotatably connected to the pair of hinge hole parts 331. The hinge groove part 332 may be provided between the pair of hinge hole parts 331. The hinge protuberant portions 140 of the separate connector body portions 110 may be rotatably accommodated in the hinge groove part 332.

The second clamp threaded portion 340 may protrude in a helical shape on an outer surface of the second connector clamp portion 320 to extend continuously in the rotation direction of the first clamp threaded portion 240. For example, when the first body 200 is closed by the second body 300, the second clamp threaded portion 340 may take the form of a helix together with the first clamp threaded portion 240 of the first body 200. The boot 400 may be rotatably coupled to the first clamp threaded portion 240 and the second clamp threaded portion 340.

The pressing bump portion 350 may protrude from the second connector clamp portion 320 to apply pressure to a lower outer surface of the optical cable. In a state that the optical cable is inserted in the connector unit 100, when the first body 200 is closed by the second body 300, the pressing bump portion 350 may apply pressure to the lower outer surface of the optical cable, thereby stably fixing the optical cable in place.

Particularly, when the first body 200 is closed by the second body 300, the pressing bump portion 350 of the second body 300 applies pressure to a lower outer surface of a front portion of the optical cable within the optical connector 10, and the pressing protuberant portion 250 of the first body 200 applies pressure to an upper outer surface of a rear portion of the optical cable within the optical connector 10, whereby the optical cable may be securely fixed by the pressing bump portion 350 and the pressing protuberant portion 250.

The boot 400 may fix the optical cable inserted in the connector unit 100 by being rotatably coupled to the first body 200 and the second body 300.

For example, when fitted onto the first connector clamp portion 220 of the first body 200 and the second connector clamp portion 320 of the second body 300, the boot 400 may be rotatably coupled to the first connector clamp portion 220 and the second connector clamp portion 320, thereby rigidly fastening the first body 200 and the second body 300 together. A boot thread 410 may be formed on an inner surface of the boot 400. The boot thread 410 may be rotatably coupled to the first clamp threaded portion 240 of the first body 200 and the second clamp threaded portion 340 of the second body 300.

The operation and effects of the optical connector with the above-described construction will be described below.

First of all, once an optical cable is inserted through the boot 400, the jacket of the optical cable is removed to expose part of the optical fiber at the end of the optical cable. After the jacket is removed, the optical fiber is cut to a certain length by using a length jig and a cleaver, and the end of the optical fiber is inserted into the connector unit 100 and assembled to it. A plurality of connector units 100 with optical cables inserted in them may be assembled in a likewise manner.

After completion of the assembling of two connector units 100 where the optical cables are connected, the hinge connecting portion 330 of the second body 300 is coupled to the hinge protuberant portions 140 of the connector unit 100. Also, the connector units 100 and the second body 300 are assembled to the first body 200. At this point, two connector units 100 are seated in the mounting grooves 211 of the first body 200.

Once the first body 200, the connector units 100, and the second body 300 are assembled together, the boot 400 is rotatably coupled to the first clamp threaded portion 240 of the first body 200 and the second clamp threaded portion 340 of the second body 300, thereby completing the assembling of the optical connector 10.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. An optical connector comprising:
    a connector unit including a receiving space in which an optical cable is inserted, and an opening which opens downwardly at a rear end portion of the connector unit;
    a first body surrounding at least a portion of a top of the connector unit;
    a second body disposed under the first body, a front end portion of which is rotatably connected to the connector unit to open and close the opening; and
    a boot rotatably coupled to the first body and the second body to fix the optical cable inserted in the connector unit.

2. The optical connector of claim 1, wherein the connector unit comprises:
    a connector body portion providing the receiving space;
    a connector clamp portion extending from a rear end of the connector body portion, the connector clamp including the opening;
    a latch portion obliquely extending at an angle from a front end portion of the connector body portion; and
    hinge protuberant portions protruding from two opposite sides of the connector body portion.

3. The optical connector of claim 1, wherein the first body comprises:
    a first body portion provided with a mounting groove in which an upper portion of the connector unit is seated;
    a first connector clamp portion extending from a rear end of the first body portion so that the optical cable is inserted therein; and
    a guide flap portion obliquely extending in an upper direction from the top of the first body portion.

4. The optical connector of claim 3, wherein the first body further comprises:
    a pressing protuberant portion protruding from the first connector clamp portion to apply pressure to an upper outer surface of the optical cable.

5. The optical connector of claim 3, wherein the second body comprises:
    a second body portion to be assembled to a bottom of the first body portion;
    a second connector clamp portion extending from a rear end of the second body portion to correspond to the first connector clamp portion; and
    a hinge connecting portion provided at a front end of the second body portion.

6. The optical connector of claim 5, wherein the second body further comprises:
    a pressing bump portion protruding from the second connector clamp portion to apply pressure to a lower outer surface of the optical cable.

7. The optical connector of claim 5, wherein the connector unit comprises:
    a first connector body portion;
    a second connector body portion; and
    hinge protuberant portions protruding from two opposite sides of each of the first connector body portion and the second connector body portion, and
    wherein the hinge connecting portion comprises:
    a pair of hinge hole parts provided on two opposite sides of the front end of the second body portion so that the hinge protuberant portions on outer sides of the first connector body portion and the second connector body portion are rotatably connected thereto; and
    a hinge groove part provided between the pair of hinge hole parts so that the hinge protuberant portions on inner sides of the first connector body portion and the second connector body portion are rotatably connected thereto.

8. The optical connector of claim 5, wherein the first body further comprises:
    a first clamp threaded portion protruding in a helical shape on an outer surface of the first connector clamp portion so that the boot is rotatably coupled thereto.

9. The optical connector of claim 8, wherein the second body further comprises:
    a second clamp threaded portion protruding in a helical shape on an outer surface of the second connector clamp portion to extend continuously in a rotation direction of the first clamp threaded portion.

* * * * *